United States Patent

[11] 3,630,483

| [72] | Inventor | Carlos R. Canalizo |
| | | Dallas, Tex. |
| [21] | Appl. No. | 18,629 |
| [22] | Filed | Mar. 11, 1970 |
| [45] | Patented | Dec. 28, 1971 |
| [73] | Assignee | Otis Engineering Corporation |
| | | Dallas, Tex. |

[54] VALVES
15 Claims, 6 Drawing Figs.

[52] U.S. Cl. .................................................. 251/174,
137/72, 251/363, 277/205, 277/235, 251/214
[51] Int. Cl. ................................................. F16k 5/20
[50] Field of Search............................................ 137/72,
315; 251/315, 171, 174, 363; 277/235 R, 26, 180,
205, 206; 220/46

[56] References Cited
UNITED STATES PATENTS

| 3,384,337 | 5/1968 | Brown | 137/315 X |
| 3,163,431 | 12/1964 | Tanner | 277/180 X |
| 3,433,506 | 3/1969 | Crowe | 277/26 X |
| 2,875,917 | 3/1959 | Alkire | 277/26 UX |
| 3,477,731 | 11/1969 | Workman | 277/235 X |
| 3,166,291 | 1/1965 | Grove | 251/174 X |
| 3,270,772 | 9/1966 | Bakus | 251/315 X |
| 1,211,476 | 1/1917 | Miller | 277/26 |
| 3,371,946 | 3/1968 | Bleyle | 277/26 X |
| 3,408,097 | 10/1968 | Glasgow | 277/180 X |

*Primary Examiner*—Harold W. Weakley
*Attorney*—E. Hastings Ackley

ABSTRACT: A rotary plug valve having seat means provided with minimum interface engagement of said seat means with the valve closure means, and low-friction sealed trunnion mounts assuring low-torque actuation under high-pressure conditions and for long service intervals, wherein the seat means and the trunnion mounts are provided with secondary high-temperature seals for preventing escape of fluids from the valve in the event of damage or destruction of the primary seal means as a result of elevated temperature.

Carlos R. Canalizo
INVENTOR.

Patented Dec. 28, 1971
3,630,483
2 Sheets-Sheet 2
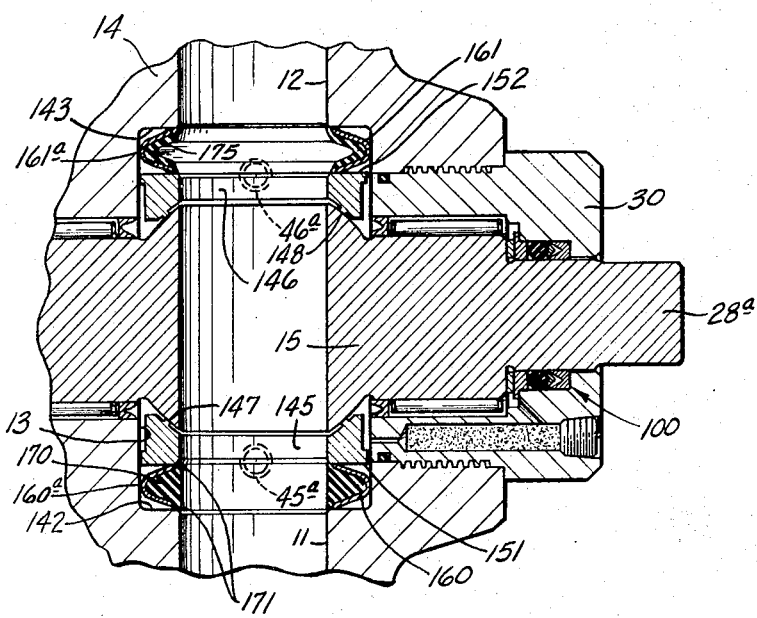
FIG. 4
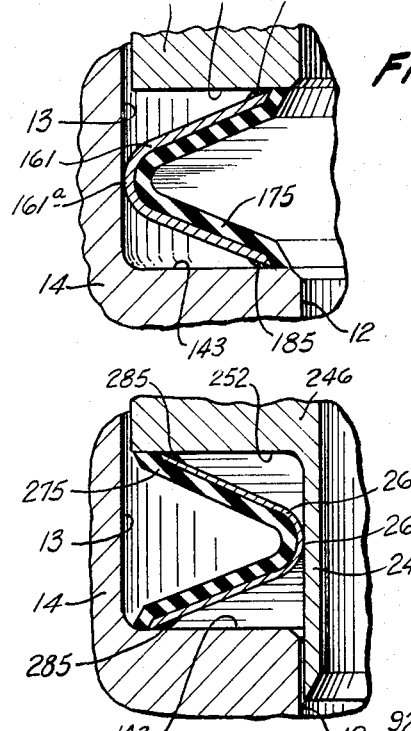
FIG. 5
FIG. 6
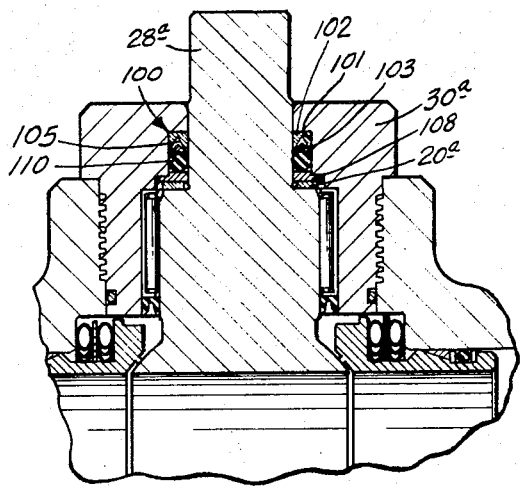
FIG. 3
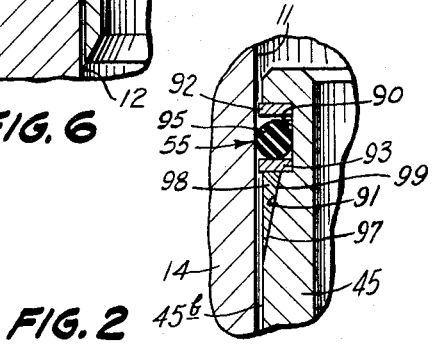
FIG. 2
Carlos R. Canalizo
INVENTOR.
BY *Armstrong Ashley*
ATTORNEY

VALVES

OBJECTS OF THE INVENTION

This invention relates to valves for controlling flow of fluid through a conduit and more specifically to rotary plug-type valves.

It is an important object of the invention to provide a rotary plug-type valve having a housing with a flow passage therethrough and a trunnion-supported valve closure element and at least one movable seat member directing flow through the closure member and the flow passage of the housing and provided with normally inactive high-temperature released pressure-activated secondary seal means for sealing between the seat member and the housing to seal off flow of fluids from the upstream side of the valve to through the valve closure member in the event of damage or destruction to the primary or original seal means between the seat member and housing to prevent escape of fluids under pressure from the flow passage of the valve housing pass the plug to the exterior of the housing.

It is still another object of the invention to provide a rotary plug-type valve in which the valve closure element is trunnion mounted and supported by low-friction type roller bearings, and the seal means between the trunnions and the valve housing are initially low-friction seal means permitting low-torque operation of the valve.

A particular object of the invention is to provide in a rotary plug-type valve, particularly in a rotary ball valve, seat means sealing between the housing and the ball closure member of the valve for directing fluid flow from the flow passage of the housing to and through the flow passage of the ball closure means, wherein the seat means is provided with initial or primary seal means in the form of a low-friction seal, such as an O-ring, for sealing between the seat means and the valve housing, and with secondary seal mans in the form of a malleable metallic secondary seal element movable into sealing engagement between the seat means and the valve housing, in the event of the occurrence of an elevated temperature at the valve which would result in damage or destruction to the primary seal means, to prevent escape of fluids under pressure from the flow passage of the valve to the exterior of the valve.

Another of the invention is to provide in a rotary plug valve seat means for sealing between the valve housing and the valve closure element wherein the seal means provides an initial low-friction or primary seal between the seat member and the valve housing and wherein said seal means also provides a resilient means biasing said seat means into initial sealing engagement with the valve closure member.

Still another object of the invention is to provide in a combination seal and resilient biasing means of the character set forth for the seat member of a rotary plug valve, secondary seal means engageable with the valve housing and the seat means to provide a metal-to-metal seal therebetween in the event of damage to or destruction of the primary seal therebetween.

BRIEF DESCRIPTION OF THE DRAWINGS

Additional objects and advantages of the invention will be readily apparent from the reading of the following description of a device constructed in accordance with the invention, and reference to the accompanying drawings thereof, wherein:

FIG. 2 is an enlarged fragmentary sectional view seal for the seat means of FIG. 1;

FIG. 3 is a fragmentary sectional view of a modified form of high-temperature seal assembly for sealing off between the trunnion of a ball closure member and the housing of a rotary plug valve;

FIG. 4 is a view similar to FIG. 1 showing a modified form of high-temperature seal means and biasing means sealing between the seat member and the valve housing with the ball closure member of a rotary plug valve;

FIG. 5 is an enlarged fragmentary sectional view of the seal means and biasing means of FIG. 4; and FIG. 6 is a view similar to FIG. 5 of a modified form of the combined seal means and biasing means showing the same sealing between the downstream seat member of a valve of the type wherein the downstream seat member acts to close off against the valve closure member.

DESCRIPTION OF PREFERRED EMBODIMENTS OF THE INVENTION

Figure 1:
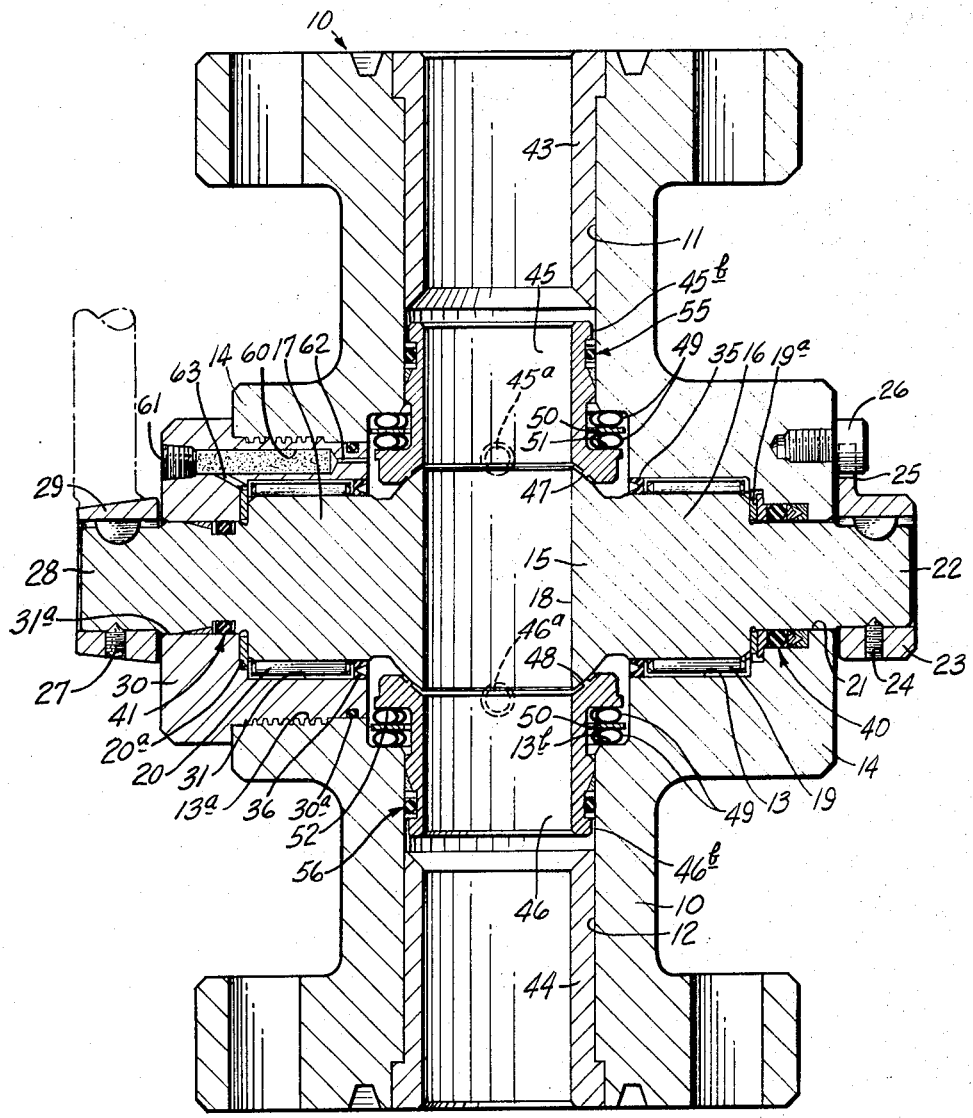
FIG. 1 is a longitudinal sectional view of a ball-type plug valve constructed in accordance with the invention having the seal means of the invention incorporated therein between the seat member and the valve housing and between the trunnions and the valve housing.

In the drawings, the numeral 10 designates a valve housing having a flow inlet passage 11 thereinto and a flow outlet passage 12 therefrom forming a flow passage through the housing. The housing also has a transverse bore 13 intersecting the inlet and outlet passages in which a valve closure member 15 is rotatably disposed. The closure member 15 is shown to be a ball-type closure having integral trunnions 16 and 17 on the diametrically opposite sides of the closure member and on opposite sides of the normal to the flow passage 18 through the ball closure member. The trunnions 16 and 17 are supported by antifrictional roller bearings 19 and 20, respectively, whereby the ball valve closure is rotatable freely about the axis of the trunnions in the transverse opening 13 in the valve housing. The right-hand end of the trunnion 16 is reduced in diameter and extends through a reduced opening 21 in the valve housing axially aligned with the opening 13 therein, and provides a projecting stub shaft 22 extending beyond the body 14 of the housing. A stop member 23 is keyed to and secured by a lock screw 24 on the projecting stub shaft and a laterally projecting slotted stop arm 25 is formed on the stop member 23 and adapted to engage a stop bolt 26 threaded into a suitable recess formed in the right side of the body 14 at a point spaced radially outwardly of the stop member 23, whereby the valve closure may be rotated between open and closed positions and the stop arm 25 will engage the head of the bolt 26 to limit rotary movement of the closure member 15 to the fully open and fully closed positions with respect to the flow passage through the valve body. The left-hand set of bearings 20 is confined in the bore 31 of a gland nut 30 which is threaded into the enlarged outer left end 13a of the bore 13 in the valve body 14, and the gland nut has a reduced central axial opening 31a beyond the bearings through which the reduced handle extension 28 on the upper end of the upper trunnion 17 projects. A handle 29 for rotating the closure member 15 is keyed to and secured by a lock screw or setscrew 27 on the projecting extension 28, whereby the handle may be manipulated to turn the closure member 15 between open and closed position.

A thrust bearing 20a is mounted in the outer end of the bore 31 of the gland nut 30 on the outer end of the trunnion between the shoulder of the extension 28 at the outer end of the trunnion and the shoulder in the bore 31 of the gland nut, and a similar thrust bearing 19a is disposed in outer right end of the bore 13 on the shoulder between the reduced axial opening 21 and the bore 13 and engages the shoulder at the outer right end of the trunnion 16 to support that end of the trunnion against longitudinal displacement in the bore 13 of the body and limit movement of the closure member longitudinally of the trunnions in the body. A V-shaped primary seal member 35 is disposed in the body opening 13 engaging the inner portion of the right trunnion 16 between the bearings 19 and the enlarged portion 13b of the bore of the valve body to keep dirt, fluids and foreign matter from entering and damaging the bearings 19. A similar seal member 36 is provided between the gland nut 30 and the inner end of the left trunnion 17 for the same purpose of dealing off foreign matter from the bearings 20. An O-ring 30a seals between the inner external end of the gland nut 30 and the enlarged housing opening 13a to prevent fluid escaping through the threads by means of which the gland nut is secured to the housing.

A high-temperature seal assembly 40 is mounted in an annular recess formed in the reduced outer right portion 22 of the trunnion 16 and is adapted to seal between the bore wall of the reduced bore 21 in the body and the reduced outer end of the trunnion disposed in such reduced bore. A similar high-temperature seal member 41 is disposed in an annular recess in the reduced outer projecting portion 28 of the left trunnion 17 for sealing between wall of the reduced bore 31a of the gland nut 30 and such reduced projecting portion 28 of the trunnion. The high-temperature seal assemblies 40 and 41 will be hereinafter more fully described.

Positioned within the inlet passage 11 is a retaining sleeve or bushing 43 and in the outlet passage 12 is a similar retaining bushing 44 and these bushings serve as flow-directing members for directing the flow of fluids through the passage into seat members 45 and 46 which are disposed in the flow passages 11 and 12, respectively, on opposite sides of the ball closure member 15. The seat members 45 and 46 are movable toward and away from the closure member to permit withdrawal of the closure member from within the valve body through the left enlarged portion 13a of the bore 13 after the gland nut 30 has been removed. Retaining bolts 45a and 46a are threaded through the wall of the valve body 14 for engaging the inner ends of the seat members 45 and 46, respectively, to hold the same in position and spaced from the ball closure member to permit the ball closure member to be inserted and removed, as has been set forth in the patent to Norman F. Brown, U.S. Pat. No. 3,384,337, dated May 21, 1968. The seat member 45 and 46 have annular arcuate sealing seat surfaces 47 and 48, respectively, which are disposed to engage the exterior spherical surface of the ball valve closure member 15 to provide a fluidtight seal between the seat and the valve closure member as the closure member is moved between open and closed positions. A pair of oppositely coiled slanted coil springs 49, separated by a spacer 50, are disposed in the enlarged opening 13a surrounding the seat member 45 and press against the shoulder 51 of the seat member and the shoulder in such enlarged opening 13a surrounding the inlet passage 11 to bias the seat member into seated sealing engagement with the ball closure member. Similarly, an identical pair of oppositely coiled slanted springs 49 separated by a spacer 50 are disposed in the enlarged opening 13a engaging the shoulder surrounding the outlet passage 12 and the flange shoulder 52 of the seat member 46 to bias the seat member to seated sealing engagement with the external spherical surface of the ball closure member 15. Other types of springs may be used, but this particular type of spring produces the desired force in a minimum amount of longitudinal space along the seat member.

A high-temperature seal element 55 is mounted in a groove on the exterior cylindrical portion of the seat element 45 for sealing between that outer cylindrical portion of the seat element 45 disposed in the inlet passage 11 of the valve housing and the bore wall of such inlet passage. A similar oppositely directed high-temperature seal assembly 56 is mounted in an external annular groove formed on the outer cylindrical portion of the seat member 46 disposed in the outlet passage 12 for sealing between the seat member 46 and the bore wall of such outlet passage in the housing. The details of construction and the operation of the high-temperature seal assemblies 55 and 56 will be hereinafter fully explained.

The relationship between the diameter of the seat 47 and the diameter of the inlet passage 11 and the diameter of the seat 48 and the diameter of the outlet passage 12 is so selected that a minimum force is applied by fluid pressure acting on the seat elements to hold the seat elements in engagement with the ball closure member 15 and thus produce a low-torque operation of the ball valve.

Formed in the housing body 14 and in the gland nut 30 are filter chambers or passages 60 in which a body of fine-capillaried matrix, such as common felt or the like, is disposed. A retaining nut 61 is threaded into the outer end of the opening 60 and retains the felt in place therein. A reduced aperture 62 is formed in the innermost end of the opening 60 for communicating with the enlarged bore 13a in the body, and a second inclined aperture 63 is formed in the gland nut communicating with the outer end of the bearings 20. A similar apertured opening or chamber (not shown) is formed in the lower portion of the body 14 communicating with the enlarged bore 13a and with the outer end of the bearings 19 in the same manner. These apertured chambers having the filter material therein provide means for distributing lubricant to the bearings and maintaining an interface between the lubricant fed to the bearings and the fluids passing through the valve body, in the same manner as is set forth in the patent to Norman F. Brown, U.S. Pat. No. 3,384,337, dated May 21, 1968. The chambers 60 and their appurtenant parts are actually located at points spaced 90° around the trunnions from the position shown, so as to be spaced from the areas of the gland nut and body against which the forces of the fluid pressure acting on the closure member trunnions are applied.

The valve heretofore described, with the exception of the high-temperature seals 40 and 41 on the trunnion extensions and the high-temperature seals 55 and 56 on the seat elements or members is generally the same as that of the Brown patent just mentioned, and the valve functions in the same manner to provide a low-torque valve designed for long service at remote points without maintenance.

This invention is particularly directed to the high-temperature seal assemblies provided on the seat members 45 and 46 and the high-temperature seal assemblies provided on the trunnion extensions 22 and 28.

Each of the high-temperature seal assemblies 41, 55, and 56 is identical in composition and structure, differing only in size to fit the members on which they are mounted and with which they seal. Therefore, a description of the sealing assembly 55 shown in FIG. 2 will be descriptive of all of such sealing assemblies. The seal assembly 40 is of similar composition but slightly different structure.

As shown in FIG. 2, an annular cylindrical recess 90 is formed in the external reduced cylindrical outer portion 45b of the seat member 45 and an inclined wedging surface 91 extends from the recess 90 toward the exterior cylindrical surface of the seat member, the inner end of the inclined surface 91 terminating short of the bottom of the recess 90 and the outer end of the inclined surface 91 merging with the exterior surface of the reduced cylindrical outer portion 45b of the seat member at a point spaced from the annular recess 90. A primary or initial seal member 95 is disposed within the recess 90 between a pair of backup or antiextrusion rings 92 and 93. The primary seal ring 95 may be an O-ring as shown, made of an elastomeric substance, which will initially seal at low pressures and which will maintain a seal at high pressures with a minimum amount of friction resisting movement of the seat member toward and from the ball closure member. A secondary seal element 98 in the form of a ring of copper, tin, copper-nickel, aluminum, or other soft, malleable, metallic substance having an inclined inner surface 97 corresponding to and complementary with the inclined surface 91 of the recess is disposed in the recess overlying the inclined surface 91, and this secondary seal element is adhered to, or bonded to, the inclined surface 91 by means of an adhesive body 97, such as an epoxy resin or the like, or by a metallic bonding material such as tin, Cerrometal, or other fusible or temperature-responsive, low-temperature melting point metallic substances.

Thus, should the valve be exposed to an elevated temperature such as a fire, the body 14 will be heated and the temperature of the body raised to such a degree that the Cerrometal or epoxy resin bonding material or adhesive will be melted or vaporized to free the malleable metallic secondary seal element 98 to be moved along the inclined surface 91 on its inclined inner surface 99, so as to be expanded or deformed into metal-to-metal sealing engagement with the exterior cylindrical surface 45b of the seat member 45 and the bore wall of the inlet passage 11 in the body. The initial or primary seal O-ring 95 will, by the force of fluid pressure within the inlet passage 11 in the housing body 14, force the secondary metallic seal element 98 along the inclined surface 91 to such expanded or deformed metal-to-metal sealing engagement between the seat member and the body. The backup rings 92 and 93 may be of a substance such as nylon or Teflon which will deform under high temperatures and pressures to permit the O-ring 95 to force the metallic secondary seal element 98 to the expanded deformed sealing position. The high-temperature seal assembly 56 on the seat member 44 functions in the same manner to effect a metal-to-metal seal between the seat member and the valve body acting in the opposite direction.

Similarly, the seal elements 40 and 41 will seal between the reduced outer right portion 22 and the outer left portion 28 of the trunnions 16 and 17, and the axial bore 21 through the outer right end of the housing and the reduced bore 31a through the gland nut 30 on the occurrence of an elevated temperature of such a value that the bond between the malleable metallic secondary seal element and the inclined surface in the recess in which the high-temperature seal is mounted is rendered ineffective to hold the secondary seal element against movement. The pressure within the passages and opening 13 of the body will act on the O-ring primary seal members to move the secondary seal elements outwardly along the inclined surfaces of the secondary seal elements and the recesses into expanded or deformed metal-to-metal sealing engagement with the reduced trunnion sections and the bore wall of the reduced bores in the body gland nut 30. Thus, fluid under pressure within the bore 13 of the body cannot escape around the trunnion reduced end portions extensions in the case of an elevated temperature such as a fire occurring at the valve. Most important, however, is the provision of the high-temperature seal elements 55 and 56 on the valve seat members 45 and 46.

The foregoing high-temperature seal assemblies provide metal-to-metal secondary seal elements which are initially held in an inactive position, but which are freed to be moved to active operative metal-to-metal sealing engagement between the housing and the seat members to seal therebetween. This is particularly important where a fire is present at a valve having a flammable material flowing therethrough, since the valve structure will be completely sealed off by metal-to-metal engagement of the malleable metallic secondary seal elements with the valve parts to prevent flammable fluids escaping from within the valve to aggravate the fire. FIG. 3 shows a slightly modified form of high-temperature seal assembly 100, similar to the seal assembly 40 of FIG. 1, disposed in an annular cylindrical recess 101 formed in the gland nut 30a, wherein the malleable metal secondary seal element 102 is V-shaped and an expander wedge member 103 is disposed between the legs of the V-shaped secondary seal element and arranged to be moved between the legs to spread the same to deform them into metal-to-metal sealing engagement with the reduced trunnion section 28a and with the bore wall of the reduced bore 31a in the gland nut 30a. A body of holding or prop material 105 is disposed in the opening between the legs of the V-shaped secondary seal element 102. The prop material may be a fusible metal, epoxy resin or the like, and holds the expander wedge member 103 against movement between the legs of the secondary seal element so long as the body or holding or prop material is intact. When a sufficiently high temperature occurs in the vicinity of the valve, the body of prop material will be vaporized or melted to render the prop material ineffective to hold the wedge expander member 103 against movement with respect to the malleable metallic secondary seal element 102, whereupon the O-ring primary seal 110 and wedge member 103 will be moved longitudinally outwardly along the reduce trunnion section by fluid pressure within the body of the valve to deform the secondary seal element 102 into metal-to-metal sealing engagement with the reduced trunnion section 28a in the gland nut. A supporting and antiextrusion ring 108 of nylon or the like, is preferably disposed between the O-ring 110 and the thrust bearing 20a in the body of the valve.

Of course, other types and constructions of high-temperature seal assemblies may be utilized equally w well. Also, the primary seal may be V-shaped seal rings rather than the O-ring 110, though a low-friction O-ring primary seal is preferred.

Obviously, should the temperature in the vicinity of the valve be elevated to such a degree that the fusible or vaporizable bond or prop between the wedge expander member 103 and the secondary seal element 102 is rendered ineffective by vaporization or melting of the prop material, pressure within the body of the housing acting on the primary seal will move the primary seal member to deform the secondary seal element to sealing engagement before the primary seal is rendered ineffective by damage or destruction, and the valve will thus be maintained leakproof, even though it is inoperative until the seal assemblies have been replaced.

FIG. 4 shows a modified form of seal and resilient biasing means between the valve seat members and the valve body for biasing the seat members toward the closure member. The housing 10 has an inlet 11 and an outlet 12 the same as that previously described. The valve closure member 15 is identical to that previously described. The gland packing nut 30 is the same as that of the form first described, and the high-temperature sealing assembly 100 is the same as that illustrated and described in FIG. 3. The seat member 145 disposed in the inlet opening 11 of the valve housing has an angularly directed projecting seat and sealing flange 147 which seats against the exterior spherical surface of the ball valve in the same manner as that of the seat member 45 first described. Similarly, the seat member 146 has a seat and sealing flange 148 which seats against the exterior surface of the ball closure member 15 in the same manner as the seat and sealing flange 48 of the seat member 46 of the form first described.

The seat members 145 and 146, however, are substantially shortened in length, and have at their outer ends abrupt planar shoulders 151 and 152 against which metal seal and biasing rings 160 and 161, respectively, are disposed to engage. The seal and biasing rings have a rounded V-shaped convolute cross section with divergently inwardly extending arms, and the inner ends of the divergent arms of the seal rings engage inwardly facing shoulders 142 and 143, respectively, in the inlet passage 11 and the outlet passage 12 of the valve body and the planar ends 151 and 152 of the seat members 145 and 146, respectively. Due to their natural resiliency, the convolute seal rings 160 and 161 bias the seat members 145 and 146 toward the ball closure member 15 to maintain the seat members in sealing engagement therewith. The diameter of the inner ends or lips of the divergent arms of the seal rings 160 and 161 is so chosen that fluid pressure within the flow passages of the valve will act on the seat members 145 and 146 to bias the same toward sealing engagement with the closure member, in addition to the biasing force exerted on the seat members by the spring seal rings. Shown in the seal ring 160 is a body of elastomeric sealing material 170 molded into the concave interior of the convolute seal ring, which has an internal diameter less than the internal diameter of the divergent arms of the seal ring, so that a body of soft or flexible elastomeric material 171 projects beyond the inner ends or lips of the arms of the metallic seal ring 160. These lips 171 project beyond the metal of the seal ring to engage against the bore wall of the inlet passage 11 at the shoulder 142, and against the planar end or shoulder 151 of the seat ring 145 to provide an initial low-pressure seal therebetween. Of course, higher pressures will render the seal still more effective and the metal seal ring 160 will support the elastomeric material under such higher pressures to prevent extrusion thereof.

Should a temperature condition arise at the valve in which the temperature was elevated to such a degree that the elastomeric filler material 170 is destroyed or damaged to such an extent that it does not seal with the valve body or seat member, the metal seal ring 160 would serve as a secondary seal to retain pressure within the valve body and seal metal-to-metal between the valve body shoulder 142 and the planar end 151 of the seat ring 145 so that a continuous metal-to-metal sealing engagement is provided between the valve body and the seat ring and the valve closure member 15 in such event. This metal-to-metal seal would prevent escape of fluids from within the valve in the event the valve closure member is closed. Similarly, the seal ring 161 in the outlet passage 12 of the valve body is provided with a thin inner layer of elastomeric sealing material 175 which extends beyond the inner ends of the divergent arms of the seal member 161 and provides a soft seal for low-pressure sealing between the seat member 146 and the shoulder 143 in the valve body. The elastomeric sealing material offers a slightly lesser resiliency and biasing force than that of the solid body 170 tending the spread the arms of the seal rings, and so a lesser force biasing the seat rings toward seating engagement with the closure member. However, all other functions of the sheath of elastomeric material 175 are the same as those of the solid body of such material 170 of the form first described in the seal ring 160. On destruction of the elastomeric material, the metallic secondary seal ring 161 would seal between the valve body and the seat member 146, and so provide a continuous metal-to-metal sealing engagement between the body 10, and the seal ring 161, the seat member 146 and the valve closure member 15, in the event of application of pressure from the outlet passage 12 of the valve body. Should fluid pressure escape into the opening 13 in the valve body, the high-temperature seal member 100 at each end of the reduced trunnion sections of the valve closure member would function to prevent escape of fluid pressures between those members and so close off the valve entirely against escape of fluids from within the valve. This is particularly important when combustible fluids or flammable materials are being conveyed through the conduits connected with the valve.

Furthermore, as shown in FIG. 5, the metallic biasing and seal ring 161 may be formed with a thin coating or bead 185 of fusible metal such as Cerrometal, lead, tin, or the like, on the outer edge portions of the divergent arms of the ring, and this soft metal will also form a seal between the seal ring 161 and the shoulder 151 of the seat ring and the shoulder 143 of the valve body. The soft metallic material will form a low-pressure seal between the seal ring 161 and the valve body and seat member with which it is associated. In the event of a high temperature occurring at the valve, the fusible metal 185 may melt, or, if the material is an epoxy resin or the like, may be vaporized, and permit metal-to-metal engagement of the deformable metal secondary seal member 160 with the valve body and seat member the same as has been previously described. The outer convex portion 160a and 161a, respectively, of the seal rings 160 and 161 abuts against the bore wall of the central opening 13 in the valve body and is supported thereby with the divergent arms engaging the seat member and shoulders 142 and 143, respectively, to provide and maintain a metal-to-metal seal under high-temperature conditions so that the valve will not leak under such conditions.

FIG. 6 shows a valve seat member 246 having an integral outwardly projecting or extending sleeve 246a which extends outwardly from the end shoulder 252 of the seat member and is movable in the outlet passage 12 in the valve body. The metallic biasing and seal ring 260 is a mirror image in cross section of the ring 160 of FIG. 5, having its convex base portion 260a in its inner diameter engaging the sleeve 246a and the divergent arms extending outwardly around the ring. A sheath of relatively soft elastomeric primary sealing material 275 is bonded to the inside of the divergent areas of the ring and has lip portions sealing by engaging the end shoulders 252 of the seat member and the shoulder 143 in the valve body to seal between the body and seat member and to bias the seat member toward the closure member in the same manner as the ring 161 of FIG. 5. This form of the biasing and seat ring 260 seals between the body and seat member on the downstream side of the closure member 15 to prevent fluid pressure from upstream flowing through the valve body to the outlet passage of the valve body. An identical biasing and seat ring disposed to engage an outwardly projecting sleeve on the seat member (not shown) in the inlet passage 11 will prevent leakage from downstream to the inlet passage. The soft metal seal 285 on the outer edge portions of the divergent arms of the bearing and seal ring 260 provides a low-pressure seal like that of the seal 185 of FIG. 5.

It will therefore be seen that a valve has been illustrated and described which is provided with a high-temperature seal assembly for sealing between the movable valve seat members and the valve body or housing, said assembly having a primary seal which is effective to seal under low-pressure conditions and to maintain the seal under normal temperature and high-pressure conditions between the movable seat member and the valve body, and which seal assembly has a malleable metal secondary seal element which is normally held in inactive position and which is released upon the occurrence of an elevated temperature of a predetermined value to permit the initial seal member to move the secondary seal element to active metal-to-metal sealing engagement with the seat member and the valve body. A similar structure is provided between the trunnions for the rotatable plug closure member and the valve housing to prevent escape of fluids between the trunnions and the housing members supporting the trunnions in the event of the occurrence of an elevated temperature at the valve.

It will also be seen that a combination seal element and a biasing means has been disclosed for biasing the seat member into sealing engagement with the rotatable closure member, which seal ring has a body of elastomeric type or similar type low-pressure initial sealing material which may be destroyed under conditions of high temperature. The metal seal ring then serves as a secondary seal element to provide a metal-to-metal seal between the valve body and the seat members. The elastomeric low-pressure seal material also serves, together with the natural resiliency of the metal secondary seal element of the seal ring to bias the valve seat member into engagement with the closure member of the valve, and the amount of such material in the concave portion between the divergent arms of the seal ring may be varied to control the biasing force. Also, the diameter of the seal rings engaging the seat members can be controlled to control action of pressure fluid on the seat members. In addition, the end portions of the divergent arms of the biasing and seal ring may be provided with an epoxy resin or fusible metal coating for sealing between the arms of the seal rings and the valve body and seat members to provide an initial low-temperature seal between the metallic secondary seal element of the ring and the seat members. The primary seals may be rendered ineffective upon the occurrence of a high-temperature condition at the valve structure to render the elastomeric or like low pressure and temperature sealing material ineffective and permit the metallic secondary seal element to move into metal-to-metal sealing engagement with the valve body and seat member to provide a positive closure under high-temperature conditions.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A rotatable plug-type valve having a body with a flow passage therethrough and a rotatable closure member and movable seat members disposed in the flow passage of the valve on opposite sides of the closure member for sealing thereagainst, and a high-temperature seal assembly sealing between each of said movable seat members and the valve housing comprising: a low-temperature low-pressure elastomeric primary seal member initially sealing between said movable seat member and the valve body; a secondary malleable metallic seal element disposed between said body and said seat member; heat yieldable means initially holding said secondary metallic seal element in an inactive position spaced from metal-to-metal engagement with said seat member and body and yielding under elevated temperature to permit said secondary seal member to move into metal-to-metal sealing engagement between said seat member and body upon the occurrence of such predetermined elevated temperature.

2. In a rotary plug-type valve having a housing with a flow passage therethrough and a rotatable closure member and movable seat members disposed in the flow passage of the housing on opposite sides of the closure member for sealing thereagainst, a high-temperature seal assembly for sealing between each of said movable seat members and the valve housing comprising: a primary seal member of an elastomeric material disposed on one of said housing and seat member and initially engaging said housing and seat member to provide an initial low-pressure seal and to seal between said housing member for all pressures within the valve; and a malleable metallic seal element initially held in inactive nonsealing position in said recess and movable to an active sealing engagement with the housing and seat member by fluid pressure acting on the primary seal member; and holding means holding said secondary seal element in said inactive position and formed of a material which becomes ineffective to hold such secondary seal element against movement from inactive to active metal-to-metal sealing engagement with the seat member and housing under elevated conditions of temperature applied to the valve.

3. A rotary plug-type valve having a housing with a flow passage therethrough and a trunnion-mounted rotatable closure member and movable seat members disposed in the flow passage of the housing on opposite sides of the closure member for sealing thereagainst, a high-temperature seal assembly between the trunnion mounts of the rotatable closure member and the valve housing for sealing therebetween comprising: a primary seal member of an elastomeric material disposed on one of said housing and trunnion mount and initially engaging said trunnion mount to provide an initial low-pressure seal and to seal between said trunnion mount and housing for all pressures within the valve; and a malleable metallic secondary seal element initially held in inactive nonsealing position in said recess and movable to an active sealing engagement with the housing and trunnion mount by fluid pressure acting on the primary seal member; and holding means holding said secondary seal element in said inactive position and formed of a material which becomes ineffective to hold such secondary seal element against movement from inactive to active metal-to-metal sealing engagement with the trunnion mount and housing under elevated conditions of temperature applied to the valve.

4. The combination set forth in claim 2 wherein each seat member is formed with an annular external recess therein and the high-temperature seal assembly is disposed in said recess and comprises: an elastomeric primary seal for sealing between said seat member and housing under low pressure; and a malleable metallic secondary seal member initially held in an inactive inoperative sealing position in said recess and movable by said primary seal to an active sealing position by fluid pressure acting on said seat member; and means yieldably holding said secondary seal member against movement from inactive to active position.

5. The combination of claim 4, wherein the means yieldably holding the secondary seal member in initial inactive position comprises a heat-responsive material yielding at an elevated temperature to free said secondary seal member for movement to sealing position prior to heat damage or destruction of said elastomeric primary seal.

6. The combination of claim 2 wherein wedge means is provided on one of said seat member and housing, a wedge surface is formed on said secondary seal member complementary said wedge means, and said holding means is disposed between said secondary seal member and said seat member holding said secondary seal member against movement with respect to said wedge means, said holding means being formed of material rendered ineffective to hold said secondary seal member against such movement by an elevated temperature lower than a temperature at which said elastomeric primary seal member is damaged or destroyed; said secondary seal member being deformed into metal-to-metal sealing engatement with said seat member and said housing by fluid pressure acting on said primary seal member after said holding means is rendered ineffective.

7. The combination of claim 6 wherein the malleable metallic secondary seal element is V-shaped, the wedge means has V-shaped wedge surfaces engageable within the V-shaped secondary seal element to deform the same to metal-to-metal sealing engagement, and the heat-responsive holding means is disposed between the V-shpaed secondary seal element and the wedge surfaces of the wedge means.

8. The combination of claim 6 wherein the high-temperature seal assembly on each seat member is disposed to seal in the opposite direction of said valve flow passage.

9. A valve of the character set forth in claim 3 wherein a high-temperature seal assembly is mounted between each seat member and the valve housing comprising: a primary seal member of an elastomeric material disposed on one of said housing and seat member and initially engaging said member to provide an initial low-pressure seal and to seal between said member for all pressures within the valve; and a malleable metallic seal element initially held in inactive nonsealing position in said recess and movable to an active sealing engagement with the housing and seat member by fluid pressure acting on the primary seal member; and holding means holding said secondary seal element in said inactive position and formed of a material which becomes ineffective to hold such secondary seal element against movement from inactive to active metal-to-metal sealing engagement with the seat member and housing under elevated conditions of temperature applied to the valve.

10. A rotatable plug-type valve having a body with a flow passage therethrough, a rotatable closure member, movable seat members disposed in the flow passage of the valve on opposite sides of the closure member for sealing thereagainst, and a high-temperature seal assembly sealing between each of said movable seat members and the body comprising: an annular resilient metallic seal ring having a convolute cross-sectional configuration disposed between each of said movable seat members and the valve housing; and elastomeric seal means carried by said resilient annular metallic seal ring disposed between said metallic seal ring and said seat member and said housing to hold said metallic seal ring out of metal-to-metal engagement with said seat member and said housing; said elastomeric seal means providing an initial low-pressure seal between said seal ring, said seat member and housing and heat yieldable under elevated temperature to permit said metallic seal ring to move into metal-to-metal sealing engagement with said seat member and said housing; said metallic seal ring and said elastomeric seal means biasing said seat member toward engagement with the closure member of said valve.

11. A valve of the type set forth in claim 10 wherein said elastomeric seal means comprises: a body of elastomeric material bonded to and filling the concave portion of said resilient metallic seal ring and having edge portions projecting beyond the free opposite divergent ends of the convolute cross-sectional ring and disposed to engage the seat member and the valve housing to seal therewith under low pressure and to maintain the seal under high pressure at normal temperatures.

12. A valve of the character set forth in claim 10 wherein the cross-sectional configuration of the resilient metallic seal ring is substantially arcuate at its base portion and has divergent arms extending outwardly from the arcuate base portion, the free ends of the arms having the elastomeric seal means thereon disposed to engage the seat member and the valve housing, said metallic seal ring and elastomeric seal means acting to bias the seat member toward sealing engagement with the closure member of the valve.

13. A valve of the character set forth in claim 12 wherein the resilient metallic sealing ring is also provided with a soft heat fusible metallic sealing material on the exterior free end portions of the arms thereof separating the ends of the arms from the seat member and the valve housing at low pressures.

14. A valve of the character set forth in claim 11 wherein the base portion of the resilient metallic seal ring is engageable with one of the valve housing and seat members to be supported thereby with the free ends of the arms of said seal ring disposed with the elastomeric seal means engaging oppositely facing spaced shoulders on the valve housing and seat member for biasing the seat member toward the closure member.

15. A seal ring of the character set forth in claim 11 wherein a soft heat fusible metallic seal coating is applied to the external outer edge surfaces of the opposed divergent arms of the resilient ring and disposed to engage oppositely facing surfaces of the seat member and valve housing to separate the ends of such arms from said oppositely facing surfaces and to seal therewith under low pressures and to yield at an elevated temperature to permit the ends of the arms of the resilient ring to engage and maintain a metal-to-metal seal with said oppositely facing surfaces during all pressure conditions thereafter supplementing the elastomeric seal.

* * * * *